United States Patent [19]

Kimbrow et al.

[11] Patent Number: 5,825,768
[45] Date of Patent: Oct. 20, 1998

[54] INTERFACE FOR AN ASYMMETRIC DIGITAL SUBSCRIBER LINE TRANSCEIVER

[75] Inventors: James W. Kimbrow, Georgetown; Raymond P. Voith, Austin, both of Tex.

[73] Assignee: Motorola, Inc., Schaumburg, Ill.

[21] Appl. No.: 723,437

[22] Filed: Sep. 30, 1996

[51] Int. Cl.⁶ .................................................. H04J 1/06
[52] U.S. Cl. .................... 370/341; 370/343; 370/486; 370/375
[58] Field of Search ..................... 370/341, 343, 370/431, 476, 252, 366, 375, 376, 378, 484, 486, 489; 455/4.2, 6.1, 6.3, 5.1

[56] References Cited

U.S. PATENT DOCUMENTS

| | | | |
|---|---|---|---|
| 5,247,347 | 9/1993 | Litteral et al. | 455/4.2 |
| 5,495,483 | 2/1996 | Grube et al. | 370/341 |
| 5,519,708 | 5/1996 | Van der Veen | 370/366 |
| 5,533,008 | 7/1996 | Grube et al. | 370/17 |
| 5,534,912 | 7/1996 | Kostreski | 348/6 |

FOREIGN PATENT DOCUMENTS

WO 95/17046  6/1995  WIPO .

OTHER PUBLICATIONS

Alliance for Telecommunications Industry Solutions, "Asymmetric Digital Subscriber Line (ADSL) Metallic Interface", Draft American National Standard for Telecommunications, Network and Customer Installation Interfaces, T1E1.4/94–007R7, pp. i–xii and pp. 2–171, 1994.

*Primary Examiner*—Chau Nguyen
*Attorney, Agent, or Firm*—Daniel D. Hill

[57] ABSTRACT

An interface (50) for a transceiver (5) for use in an asymmetric digital subscriber line (ADSL) system includes a routing table (200) which includes addresses of locations in a frame memory (150). When the transceiver (5) is operated as a central office transmitter input port data is received from several input ports. The routing table (200) addresses assign locations in the frame memory (150), corresponding to channels in the ADSL frame, which may be arbitrarily assigned. A control circuit (148) services the input ports by transferring data between the input ports and the address selected by the routing table (200). When operated as a remote terminal receiver, the transceiver (5) uses a routing table addressing the system except that the ports become output ports and frame memory (150) locations provide data to the output ports.

25 Claims, 5 Drawing Sheets

FIG. 4

| | 200 | | | | | |
|---|---|---|---|---|---|---|
| X | 211 | SYNC | 221 | FAST | 231 | 201 |
| START A | 212 | CURRENT A | 222 | FINISH A | 232 | 202 |
| START B | 213 | CURRENT B | 223 | FINISH B | 233 | 203 |
| START C | 214 | CURRENT C | 224 | FINISH C | 234 | 204 |
| START D | 215 | CURRENT D | 225 | FINISH D | 235 | 205 |
| START E | 216 | CURRENT E | 226 | FINISH E | 236 | 206 |
| START F | 217 | CURRENT F | 227 | FINISH F | 237 | 207 |
| START G | 218 | CURRENT G | 228 | FINISH G | 238 | 208 |
| X | 219 | $AEX_I$ | 229 | $AEX_F$ | 239 | 209 |
| X | 220 | $LEX_I$ | 230 | $LEX_F$ | 240 | 210 |

FIG. 6

| | 300 | | | | | |
|---|---|---|---|---|---|---|
| X | 311 | SYNC | 321 | FAST | 331 | 301 |
| START A=39 | 312 | CURRENT A=39 | 322 | FINISH A=69 | 332 | 302 |
| START B=1 | 313 | CURRENT B=1 | 323 | FINISH B=39 | 333 | 303 |
| X | 314 | X | 324 | X | 334 | 304 |
| START D=82 | 315 | CURRENT D=82 | 325 | FINISH D=102 | 335 | 305 |
| START E=102 | 316 | CURRENT E=102 | 326 | FINISH E=112 | 336 | 306 |
| START F=69 | 317 | CURRENT F=69 | 327 | FINISH F=79 | 337 | 307 |
| X | 318 | X | 328 | X | 338 | 308 |
| X | 319 | $AEX_I$=112 | 329 | $AEX_F$=79 | 339 | 309 |
| X | 320 | $LEX_I$=113 | 330 | $LEX_F$=80 | 340 | 310 |

INTERFACE FOR AN ASYMMETRIC DIGITAL SUBSCRIBER LINE TRANSCEIVER

FIELD OF THE INVENTION

This invention relates generally to communications systems, and more particularly, to a transceiver for an asymmetric communications system.

BACKGROUND OF THE INVENTION

In order to make high data rate interactive services such as video and internet access available to more residential and small business customers, high-speed data communications paths are required. Although fiber optic cable is the preferred transition media for such high data rate services, it is not readily available in existing communication networks and the expense of installing fiber optic cabling is prohibitive. Current telephone wiring connections, which consist of copper twisted-pair media, were not originally designed to support the data rates or bandwidth required for interactive services such as video on demand or even high speed internet connections. Asymmetric Digital Subscriber Lines (ADSL) technology has been developed to increase the effective bandwidth of existing-pair connections, allowing interactive services to be provided without requiring the installation of new fiber optic cable.

Discrete multi-tone (DMT) is a multi-carrier technique which divides the available bandwidth of twisted-pair copper media connections into mini-subchannels or bins. The DMT technique has been proposed for adoption by the ANSI T1E1.4 (ADSL) committee to be used in ADSL communications systems. In the proposed ADSL standard, T1E1.4 DMT is used to generate 250 separate 4.3125 kilohertz subchannels from 26 kilohertz to 1.1 megahertz for downstream transmission to an end user. Likewise, DMT is used to generate 26 subchannels from 26 kilohertz to 138 kilohertz for upstream transmission by an end user. The asymmetric transmission protocol implemented by the proposed ADSL standard requires a higher rate of data transmission from a central office to a remote terminal and a lower rate of data transmission from a remote terminal to a central office. As a result, different processing sequences are required at the remote terminal and central office ends.

Note that, according to the proposed ADSL standard, sources of information such as video servers are assigned to high speed channels for transmission from the central office to the remote terminal. These channels are known as A channels and may be transmitted from the central office to the remote terminal on either an interleaved or non-interleaved basis. In addition, there are other channels known as L channels which are transmitted from the central office to the remote terminal bi-directionally between the central office and remote terminal. The L channels may also be interleaved or non-interleaved. When the remote terminal receives the information on the four available A channels, the user assigns or connects the A channels to physical reception devices such as televisions, video cassette recorders and similar devices. Thus, the proposed ADSL standard provides a mechanism for asymmetrically transmitting video information from the central office to the remote terminal so that such applications as rental of motion pictures may be accomplished without the need for the user physically traveling to the facility and renting a physical video cassette. In addition, the proposed ADSL standard allows other services such as access to the Internet.

BRIEF DESCRIPTION OF THE DRAWINGS

FIG. 4 illustrates, in block diagram form, a memory which stores channel addresses and control byte addresses for implementing the flexible channel assignment in FIG. 2.

FIG. 6 illustrates an example of address assignment useful in understanding the present invention.

DESCRIPTION OF A PREFERRED EMBODIMENT

Generally, the present invention provides an interface for a transceiver for use in an asymmetric digital subscriber line (ADSL) system that includes a routing table for storing addresses of locations in a frame memory. When the transceiver is operated as a central office transmitter input port, data is received from several input ports. The routing table addresses are used to assign locations in the frame memory corresponding to channels in the ADSL frame, which may be arbitrarily assigned. A control circuit services the input ports by transferring data between the input ports and the address selected by the routing table. When operated as a remote terminal receiver, the transceiver uses a routing table for addressing the ADSL system in a manner similar to the central office transmitter, except that the input ports become output ports and frame memory locations provide data to the output ports.

This arbitrarily selectable assignment of ADSL high speed data channels to input and output ports allows a level of flexibility which is useful to the user at the remote terminal. For example, a user may assign more than one channel to be provided to particular output port, or the central office may assign more than one input port to a particular channel. The present invention can be more fully described with reference to FIGS. 1–6.

Figure 1:
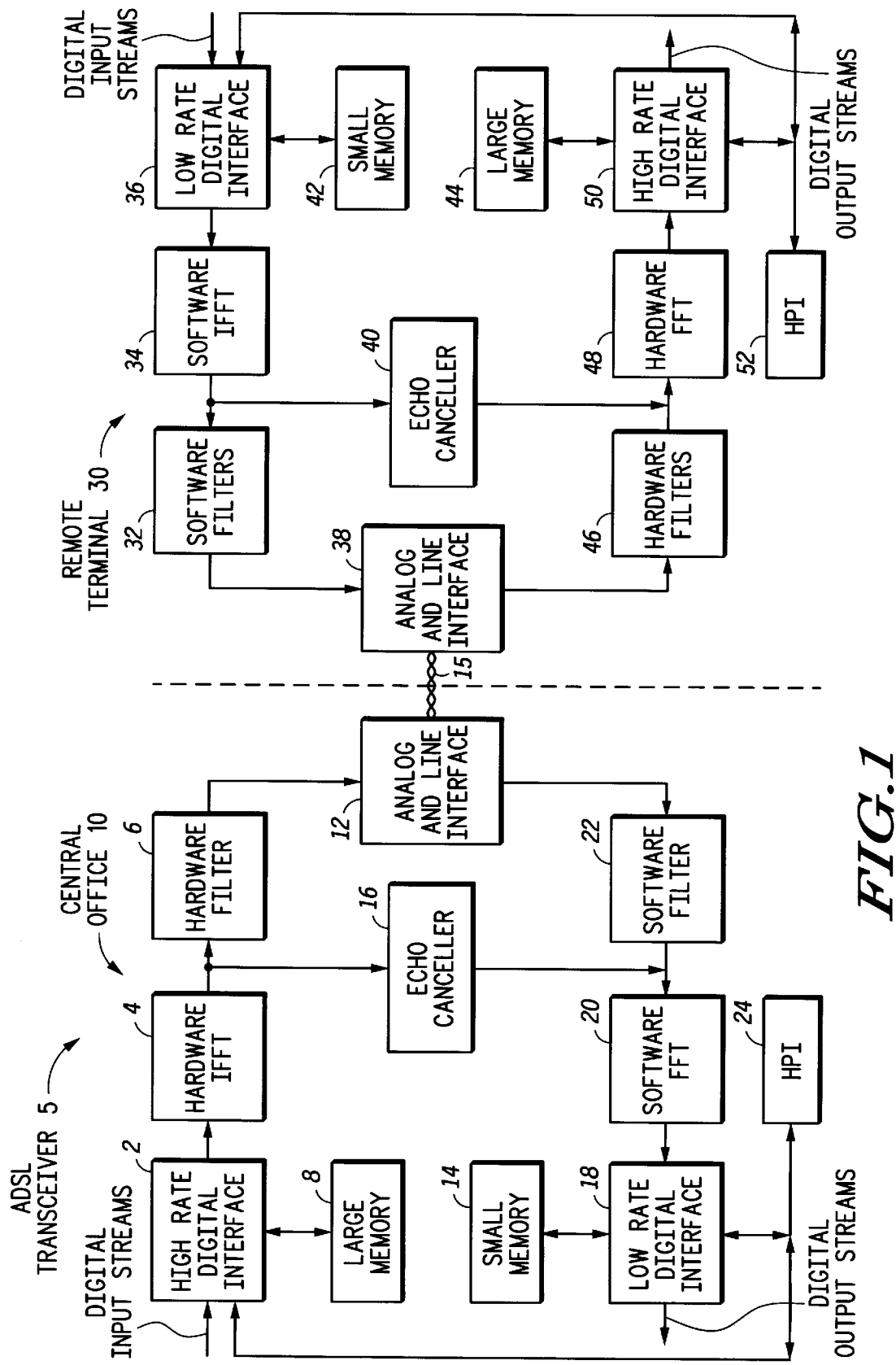
FIG. 1 illustrates, in block diagram form, an asymmetric digital subscriber line (ADSL) system in accordance with the present invention.

FIG. 1 illustrates an ADSL communication system 1. ADSL communication system 1 includes a central office 10 and a remote terminal 30 which are connected together via a twisted pair of copper wires forming a telephone line 15. Central office 10 includes a high rate digital interface 2, a hardware IFFT (Inverse Fast Fourier Transform) 4, a hardware filters block 6, a large memory 8, an analog and line interface 12, a small memory 14, an echo canceller 16, a low rate digital interface 18, a software FFT (Fast Fourier Transform) 20, and a software filter 22. In central office 10, high rate digital interface 2 receives a digital input stream. High rate digital interface 2 is bidirectionally coupled to large memory 8 and transfers information to hardware IFFT 4. Hardware IFFT 4 has an output coupled to each of hardware filters block 6 at echo canceller 16. Hardware filters block 6 has an output coupled to analog and line interface 12. Analog and line interface 12 is bidirectionally coupled to telephone line 15, and has an output coupled to software filter 22. Software filter 22 has an output coupled to software FFT 20. Software FFT 20 has an output coupled to low rate digital interface 18. Low rate digital interface 18 is bidirectionally coupled to small memory 14, and has an output for providing a digital output stream.

Remote terminal 30 includes a software filters block 32, a software inverse fast Fourier transform (IFFT) 34, a low rate digital interface 36, an analog and line interface 38, an echo canceller 40, a small memory 42, a large memory 44, a hardware filters block 46, a hardware fast Fourier transform (FFT) 48, and a high rate digital interface 50. Low rate digital interface 36 receives a digital input stream. Low rate digital interface 36 bidirectionally couples small memory 42, and has an output coupled to software IFFT 34. Software IFFT has an output coupled to both software filter 32 and echo canceller 40. Software filters block 32 has an output coupled to analog and line interface 38. Analog and line interface 38 is bidirectionally coupled to telephone line 15 and has an output coupled to hardware filters block 46. Both echo canceller 40 and hardware filters block 46 are coupled to an input of hardware FFT 48. Hardware FFT 48 has an output coupled to high rate digital interface 50. High rate digital interface 50 is bidirectionally coupled to large memory 44. High rate digital interface 50 provides a digital output stream.

Figure 2:
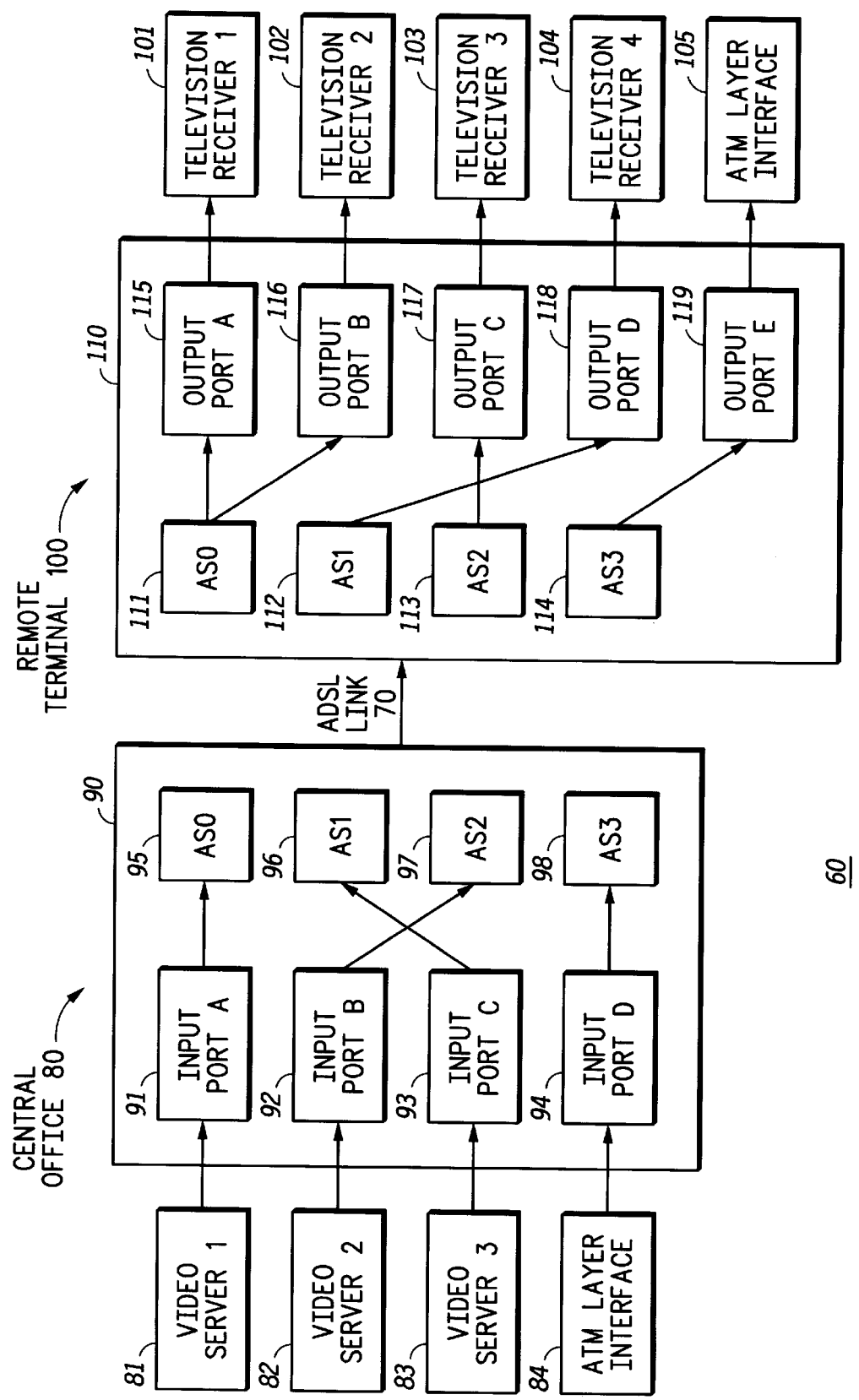
FIG. 2 illustrates, in block diagram form, a portion of the ADSL system according to the present invention.

FIG. 2 illustrates, in block diagram form, a portion 60 of the ADSL communication system 1 according to the present invention. Portion 60 includes, generally, an ADSL link 70 which represents most of the functions defined by the ADSL standard plus the physical medium, a portion of a central office 80, and a portion of a remote terminal 100. The portion of central office 80 includes several video sources such as video servers 81–83, and an asynchronous transfer mode (ATM) layer interface 84. Each of these sources provides an output to a portion of a transceiver 90 which provides selectable channel assignments. Transceiver 90 includes multiple serial input channels which receive data for transmission on ADSL link 70 through one of the high speed data portions of the ADSL frame including an input port A 91, an input port B 92, an input port C 93 and an input port D 94. Transceiver 90 includes four ADSL ports corresponding to the four high speed data channels defined by the ADSL standard including AS0 95, AS1 96, AS2 97 and AS3 98. These high speed data channels are framed according to the ADSL standard for transmission to the remote terminal. According to the present invention, however, each input port is selectively assigned to one or more output ports instead of being assigned to dedicated output ports. Thus, for example, in transceiver 90, input port A is assigned to AS0 port 95, input port B is assigned to AS2 channel 97, input port C 93 is assigned to output port AS1 96 and input port D 94 is assigned to output AS3 98.

Similarly, remote terminal 100 includes several devices for reception of data from the central office which may be, for example, televisions, video cassette recorders, and the like. Illustrated in FIG. 2 are four television receivers 101–104, plus an ATM layer interface 105. Each of these pieces of equipment is connected to a portion of the transceiver 110 which is connected to ADSL link 70. Transceiver 110 includes four high speed data input ports which are defined by the ADSL standard labeled AS0 111, AS1 112, AS2 113 and AS3 114. Each of five output ports including port A 115, port B 116, port C 117, port D 118, and port E 119 is connected to a corresponding device such as television receivers 101–104 and ATM layer interface 105, respectively. However, according to the present invention, high speed input port data may be selectively assigned to any of the output ports. For example, illustrated in FIG. 2, input port AS0 111 is connected to output ports, port A 115 and output port B 116. Input port AS1 112 is connected to output port D 118. Input port AS2 113 is connected to output port C 117 and input port AS3 114 is connected to output port E 119.

This selective assignment of ADSL high speed data channels to input and output ports allows a level of flexibility which is useful to the user at the remote terminal. For example, assume that the information provided by video server 1 is a movie that the user at remote terminal 100 has subscribed to. Through the flexible channel assignment of transceiver 110, this information may be provided real time to both television receiver 101 and television receiver 102 so that viewers in two separate rooms may simultaneously view the video program. As should be apparent, the assignment of input port data to output port data is not limited to an assignment of one input port channel to two output port channels and one input port channel may be assigned to all output port channels. Similarly, one input port channel may be selectively ignored. Note, however, that this function may require communication between central office 80 and remote terminal 100 at a higher protocol level than ADSL.

Figure 3:
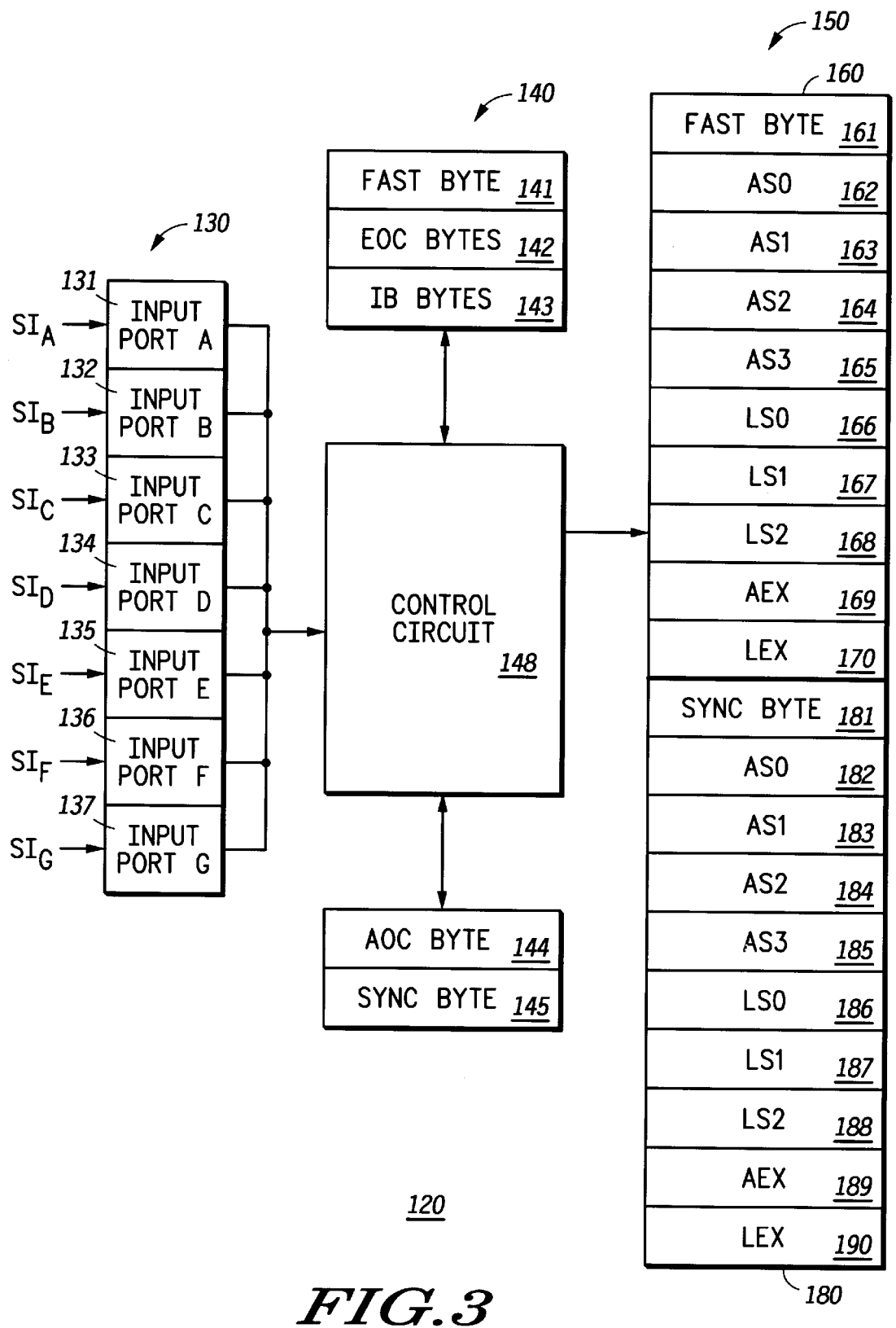
FIG. 3 illustrates, in block diagram form, a transmit portion of the ADSL transceiver of FIGS. 1 and 2.

FIG. 3 illustrates, in block diagram form, a transmit portion 120 of an ADSL transceiver useful in understanding the present invention. Transmit portion 120 includes generally, an input port 130, a digital interface 140, and a frame memory 150. Input port 130 includes seven independent input channels A–G and corresponding thereto a separate input port including input port A 131, input port B 132, input port C 133, input port D 134, input port E 135, input port F 136 and input port G 137. Each of inputs ports 131–137 receives a corresponding serial input signal labeled $SI_A$-$SI_G$, respectively. Each of input ports 131–137 is associated with a fast path portion of the ADSL frame or an interleave path portion of the ADSL frame. Thus, transmit portion 120 includes a storage area for storing control bits associated with each input port to designate whether the input port will form a portion of the ADSL frame, and to designate whether to use the fast path or the interleave path. Each designated input port receives a serial data stream and converts the serial data stream to a byte quantity by using a serial to parallel converter. In addition, each input port includes buffer storage which allows the data to be stored until transmit portion 120 can read the data for placement into the frame memory 150.

Digital interface 140 includes registers 141–145 and a control circuit 148. Control circuit 148 has an input which is connected to a selected one of input ports 131–137 and is bidirectionally connected to each of registers 141–145. Control circuit 148 also has an output connected to frame memory 150. Frame memory 150 includes memory locations corresponding to time slices of an ADSL frame and includes, generally, a fast path portion 160 and an interleave path portion 180. Fast path portion 160 includes fields 161–170, but, according to the ADSL standard, 162–170 may or may not be present for any given frame. Portion 160 includes a fast byte portion 161 followed by portions 162–165 corresponding to data channels AS0–AS3. Following channel AS3 are three low speed data channels LS0 166 through LS2 168. Following LS2 168 are two control bytes AEX 169 and LEX 170. Following LEX 170 are portions 181–190 of interleave path portion 180. Immediately following the LEX portion is sync byte 181 followed by four high speed data portions 182–185 corresponding to channels AS0–AS3. Following AS3 portion 185 are three low speed data channels 186–188 corresponding to channels LS0–LS2. Finally, following LS2 portion 188 are two overhead portions AEX 189 and LEX 190. According to the ADSL standard, one or more of the fields in either fast path portion 160 or interleave path portion 180 may be variously sized or may be completely absent, except that the sync byte 181 and fast byte 161 are always present.

Digital interface 140 illustrates a transmit portion, and is able to selectively map input ports 130 to various portions of the ADSL frame by using a routing table as illustrated in FIG. 4. If the direction of the arrows are reversed in digital interface 140, and the input ports are changed to output ports, digital interface 140 can be used to illustrate a receive portion of an ADSL transceiver.

FIG. 4 illustrates a block diagram of a routing table 200 which is used by control circuit 148 to relate port data (or output port data for the receive portion) with a selective portion of frame memory 150. Routing table 200 includes ten memory words each of which include three sections of nine bits each including memory words 201–210. Memory word 201 includes first portion 211, a second portion 221 and a third portion 231. First portion 211 is not used by control circuit 148 and thus its contents are don't cares. Portion 221 includes the address for the sync byte used for interleave portion 180 and portion 231 includes the address for the fast byte which is used to define the beginning address of the frame. Memory words 202–208 correspond to ports A–G, respectively. In first portions of words 202–208 labeled 212–218, respectively, is stored a start address of frame memory 150 of the corresponding field. Words 202–208 also include second portions 222–228 which include a current address for ports A–G, respectively. Finally, words 202–208 also include third portions 232–238 which store finish addresses of ports A–G. Word 209 includes a first portion 219 which is not used by control circuit 148 and thus, are don't care values. A second portion 229 corresponding to the AEX byte of interleave path portion 180 and a third portion 239 including the AEX byte of fast path portion 160. Word 210 includes a first portion 220 which is not used by control circuit 148 and thus is represented by don't cares, a second portion 230 for storing the address of the LEX byte of the interleaved path portion 180, and a third portion 240 for storing the address of the LEX byte of fast path portion.

Now considering FIGS. 3 and 4 together, it is possible to describe the operation of transceiver 120. Control circuit 148 accesses each input port in order in a "round robin" fashion. For example, when a byte is present in the buffer in input port A, control circuit 148 reads the current address portion 222 of word 202 and stores the byte in the memory location of frame memory 150 which the current address points to. Control circuit 148 then increments the current address. Control circuit 148 uses a predetermined algorithm to determine how many bytes, which are stored in the buffer of input port A, are accessed before moving on to the input port B. Control Circuit 148 accesses all of the bytes from the buffer of input port A up to a maximum number of bytes, before moving on to the input port B. The maximum number of bytes is a function of the data rate on input port A.

After servicing input port A, control circuit 148 then proceeds to input port B and likewise uses the current address in the second portion of the corresponding word in routing table 200 to determine where in frame memory 150 to place the byte or bytes that have been received from input port B. Control circuit 148 proceeds in similar fashion until frame memory 150 is filled. Note that when the end of a channel is reached, the current address will equal the finish address and this condition can be detected through a comparison of the current address with the finish address. Upon reaching the end of the portion of frame memory 150 assigned to the given port, the current address is reset to the start address. Note that control circuit 148 also reads the overhead bytes from registers 141–145 and places them in the appropriate addresses as indicated in routing table 200.

By using routing table 200, control circuit 148 is able to assign data received at any input port to any arbitrary channel in the ADSL frame. Note that, according to the ADSL standard, the size of each of the channels within the frame is communicated between the central office and the remote terminal at initialization, however, transceiver 120 is able to arbitrarily assign data received at input ports A–G to any portion of the ADSL frame which may be flexibly assigned by a host data processor and selected by the user from time to time.

Figure 5:
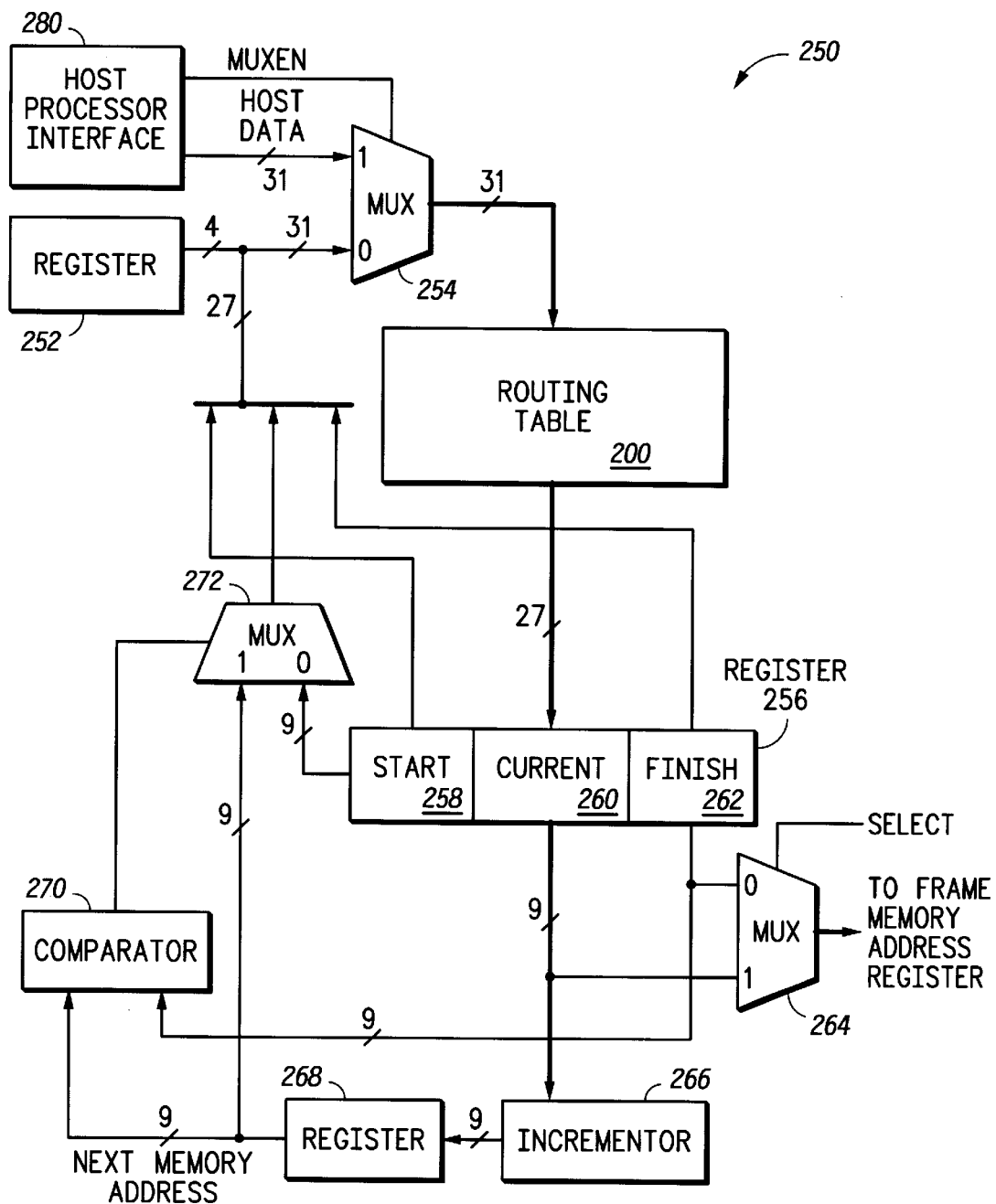
FIG. 5 illustrates, in partial block and partial logic diagram form, a control circuit portion of the transceiver of FIG. 2 useful in understanding the present invention.

FIG. 5 illustrates, in partial block and partial logic diagram form, a control circuit 250 which may be used to implement transceiver 120 of FIG. 3. Control circuit 250 includes, generally, routing table 200, register 252, a multiplexer (MUX) 254, register 256, MUX 264, an incrementor 256, a register 268, a comparator 270, and a MUX 272. Also shown in FIG. 5 is a host processor interface 280 which is used to receive commands from a host data processor (not shown) and present signals to control circuit 250 as shall be further described below.

In order for a host processor to write values to routing table 200, host processor interface 280 activates a control signal labeled MUXEN (which stands for multiplexer enable) and simultaneously provides 31 signals labeled HOST DATA to a first input of MUX 254. MUX 254 has a first input for receiving host data from the host processor interface 280, a second input for receiving 31 input signals, a control input for receiving signal MUX and MUXEN, and a 31 bit output terminal. Of the 31 signals at the output terminal MUX 254, four are used to select one of the ten memory word locations in routing table 200 while the other 27 represent the 27 bits of data in a selected word. Routing table 200 has a 27 bit output which outputs all 27 bits of a selected word. Register 256 has an input connected to the output of routing table 200 and is divided into three portions. A first portion 258 for storing a portion of the address labeled START, a second portion 260 for storing a portion of the address labeled CURRENT, and a third portion 262 for storing a portion of the address labeled FINISH. Each portion of register 256 has a corresponding 9 bit output. MUX 264 has a first input terminal connected to the output terminal of finish portion 262, a second input terminal connected to the current portion 260 of register 256, a control input terminal for receiving a signal labeled SELECT, and an output terminal which is connected to a frame memory address register not shown in FIG. 5. Incrementor 266 has an input terminal connected to current portion 260 and an output terminal. Register 268 has an input terminal connected to the output terminal of incrementor 266 and an output terminal for providing a signal labeled next memory address. Comparator 270 has a first input terminal connected to the output terminal of register 268, a second input terminal connected to finish portion 262, and an output terminal. MUX 272 has a first input terminal connected to start portion 258, a second input terminal for receiving the next memory address and a control input terminal connected to the output terminal of comparator 270 and an output terminal for providing a new current address. The output terminal of MUX 272 in conjunction with the output of start portion 258 and finish portion 262 form the 27 bit address portion of the 31 bit input to MUX 254. The additional 4 bits are received from an output of register 252.

In order to initialize routing table 200, a host processor, not shown in FIG. 5, will write commands to host processor interface 280. Host processor interface 280 will then format the appropriate data to write into routing table 200. When 31 bits of data representing the host data have been received from the host processor, the host processor interface 280 activates signal MUX enable to select the second input terminal of MUX 254. Four bits of the host data select the memory word in routing table 200 and the remaining 27 bits program the first, second and third portions of the selected memory word. During a particular cycle in which control circuit 148 of FIG. 3 services data on an input port, register 252 selects the appropriate memory word in routing table 200. In response, routing table 200 outputs the 27 bits of the memory word which are subsequently stored in register 256. During a data access in which input port data is written into frame memory 150, the select control signal selects the second input terminal of MUX 264. As a result of this channel servicing, incrementor 266 increments the current address which is then stored in register 268 as the next memory address. However, control circuit 250 compares the next memory address to finish portion 262. If these two memory addresses are equal then control circuit 250 has filled up the corresponding portion of frame memory 150. In this case, comparator 270 selects the first input of MUX 272 and the start address 258 becomes the next current address. Otherwise, the next memory address provided at the second input terminal of MUX 272 is selected as the new current address. In order to simplify the control circuitry, all 27 bits of a selected memory word are rewritten even though the start and finish addresses do not change. Note that if one of the overhead bytes associated with fast path portion 160 or interleave path portion 180 are required, the SELECT control signal selects either the first input if either the fast byte in word 201 or the AEX portion of word 209 or the LEX portion 240 of word 210 are required. Otherwise, the SELECT control signal selects the second input to MUX 264 and if control circuit 250 is filling overhead bytes of interleave portion 180, then sync portion 221 of word 201, AEX portion 229 or LEX portion 230 of word 210 may be selected.

FIG. 6 illustrates an example of this flexible channel assignment through a routing table 300. Note that in routing table 300 reference numbers correspond to like reference numbers in routing table 200 of FIG. 4. Thus, routing table 300 includes ten memory words 301–310. Each memory word includes first portions 311–320, second portions 321–330 and third portions 331–340. Note that the current address portion for each port is initially set to a starting address portion and FIG. 6 illustrates the state of routing table 300 at this point in time. Port A which is represented by word 302 has a start address of 39 and a finish address of 69. Note that the finish address actually represents the ending address plus one, thus port A would be assigned to bytes 39–68 in the frame memory. Port B, on the other hand, is assigned byte positions 1–38, thus, since the fast byte stored in portion 331 occurs at byte 0 of the frame memory, port B represents channel AS0 of the ADSL frame and port A represents channel 1 of the ADSL frame. Port A therefore, is not dedicated to channel AS0 as in known implementations. Port C does not contribute to the ADSL frame. One mechanism to indicate the absence of port C data in frame memory 150 would be to have the start address equal the finish address which would also equal the current address. However, control circuit 250 actually uses a separate register not shown in FIG. 5 which indicates ports which are not used. Port F which represents low speed data follows port A in the ADSL frame at locations 69–78. In locations 79 and 80 are located the AEX and LEX bytes of the fast path portion 160. Following fast path portion 160 is the sync byte of interleave path portion 180. Channel D, which represents the high speed channel AS2, is in the interleave path portion from addresses 82 to 101. Port E data which represents low speed data is between addresses 102 and 111 and port G data is absent. Following port F in frame memory 150, control information AEX and LEX are placed in a similar manner as illustrated in FIG. 3. This exemplary port to channel assignment illustrates, for example, how transmit data from the central office can be arbitrarily assigned to ADSL channels. The operation of control circuit 250 is nearly identical in the case of a remote terminal where the frame is being received, except that the frequent use of the flexible channel assignment would be to assign a portion of frame memory 150 to two or more ports. In the receive case, the ports are output ports for providing serial output data. So for example, if it were desired to assign AS0 data to port C as well as to port B then the starting address of port C and the finish address of port C would be the same as that of port B namely 1 and 39, respectively.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true spirit and scope of the invention.

What is claimed is:

1. An interface for a transceiver of a communications system, the interface comprising:

a plurality of input ports, each of the input ports for receiving a serial data stream, and for providing parallel data corresponding to the serial data stream;

a frame memory, organized as a plurality of channels, the frame memory for receiving the parallel data;

a control circuit, coupled to the plurality of input ports and to the frame memory, the control circuit for assigning bytes of the parallel data to the plurality of channels; and a routing table, coupled to the control circuit, which contains addresses, the addresses being used by the control circuit to arbitrarily selectively assign the bytes of the parallel data from any one or more of the plurality of input ports to any one or more channels of the plurality of channels.

2. The interface of claim 1, wherein the routing table includes a start address and a finish address for the bytes of a selected channel and a current address for a current byte being provided to the frame memory.

3. The interface of claim 2, wherein the routing table includes special addresses for control information and for synchronization of the plurality of channels.

4. The interface of claim 3, wherein the frame memory includes a fast path portion and an interleave path portion.

5. The interface of claim 3, wherein the special addresses include a fast path address and an interleave path address, wherein the fast path address and the interleave path address are used for the synchronization of the plurality of channels.

6. The interface of claim 5, wherein the special addresses further include control information, wherein the control information contained by the special addresses is defined by the fast path address and the interleave path address.

7. The interface of claim 6, wherein a host processor generates the start, current, and finish addresses, and provides the start, current, and finish addresses to the routing table.

8. The interface of claim 7, further comprising:

a memory for storing the routing table;

a register, having an input coupled to the routing table, for receiving the start, current, and finish addresses for the selected channel, and an output;

a multiplexer having a first input coupled to the register for receiving the current addresses, a second input coupled to the register for receiving the special addresses, and for providing one of either the current addresses or the special addresses as necessary to assemble a frame of data from the parallel data;

an incrementor, coupled to the register, for incrementing a current address to provide an incremented current address; and a comparator, coupled to the register and to the incrementor, for comparing a finish address to the incremented current address, and if the finish address is equal to the incremented current address, providing a start address to the routing table as a next current address, and if the finish address is not equal to the incremented current address, providing the incremented current address as the next current address.

9. The interface of claim 1, further comprising:

a second frame memory organized as a second plurality of channels, for storing output data in the second plurality of channels;

at least one output port, coupled to the second frame memory, for receiving the output data of a channel of the second plurality of channels, and for providing a serial data stream corresponding to the output data;

a second control circuit, coupled to the at least one output port and to the second frame memory, the second control circuit for assigning bytes of the output data of the channel to the at least one output port; and a second routing table, coupled to the second control circuit, which contains addresses used to assign the bytes of the output data to the at least one output port.

10. The interface of claim 9, further comprising:

a memory for storing the second routing table;

a register, having an input coupled to the second routing table, for receiving start, current, and finish addresses for a selected channel of the second plurality of channels, and an output;

a multiplexer having a first input coupled to the output of the register for receiving the current addresses, a second input coupled to the output of the register for receiving special addresses, and for providing one of either the current addresses or the special addresses as necessary to address the second frame memory for retrieving the bytes of the output data;

an incrementor, coupled to the register, for incrementing a current address to provide an incremented current address; and a comparator, coupled to the register and to the incrementor, for comparing a finish address to the incremented current address, and if the finish address is equal to the incremented current address, providing a start address to the second routing table as a next current address, and if the finish address is not equal to the incremented current address, providing the incremented current address as next current address.

11. The interface of claim 1, wherein the communications system is characterized as being an asymmetric digital subscriber line (ADSL) communications system.

12. An interface for an asymmetric digital subscriber line (ADSL) communications system transceiver, the interface comprising:

a frame memory organized as a plurality of channels, for storing output data in the plurality of channels;

a plurality of output ports, each of the plurality of output ports coupled to the frame memory, the plurality of output ports for receiving output data from the plurality of channels, and for providing a serial data stream corresponding to the output data from the plurality of channels;

a control circuit, coupled to the plurality of output ports and to the frame memory, the control circuit for assigning bytes of the output data from the the plurality of channels to the plurality of output ports; and a routing table, coupled to the control circuit, which contains addresses used to retrieve bytes of the output data from the frame memory, wherein the addresses are arbitrarily selectively assignable for assigning the bytes of the output data from a selected one or more of the plurality of channels to a selected one or more of the plurality of output ports.

13. The interface of claim 12, wherein the output data from a selected one of the plurality of channels is provided to at least two of the plurality of output ports.

14. The interface of claim 12, wherein the routing table includes a start address and a finish address for the bytes of the output data and a current address for a current byte being retrieved from the frame memory.

15. The interfaceof claim 14, wherein the routing table includes a special address for control information and for synchronization of the plurality of channels.

16. The interface of claim 15, wherein the frame memory includes a fast path portion and an interleave path portion.

17. The interface of claim 16, wherein the special address includes a fast path address and an interleave path address, wherein the fast path address and the interleave path address are used for the synchronization of the plurality of channels.

18. The interface of claim 17, wherein the special address further includes a control address, wherein the control information addressed by the control address is defined by the fast path address and the interleave path address.

19. The interface of claim 18, wherein a host processor generates the start, current, and finish addresses, and provides the start, current, and finish addresses to the routing table.

20. An interface for an asymmetric digital subscriber line (ADSL) communications system transceiver, the interface comprising:

a frame memory having a fast path portion organized as a first plurality of channels and an interleave path portion as a second plurality of channels, for storing output data in the first and second pluralities of channels;

a plurality of output ports, each of the plurality of output ports coupled to the frame memory, a selected output port of the plurality of output ports for receiving output data from a selected one of the first and second pluralities of channels, and for providing a serial data stream corresponding to the output data from the selected one of the first and second pluralities of channels;

a routing table including start addresses, current addresses, and finish addresses for retrieving the output data of the selected one of the first and second pluralities of channels; and a control circuit, coupled to the plurality of output ports, to the frame memory, and to the routing table, the control circuit for selecting the start and finish addresses for retrieving the output data.

21. The interface of claim 20, wherein the routing table further comprises special addresses for control information and for synchronization of the first and second pluralities of channels.

22. The interface of claim 21, wherein the special addresses include a fast path address and an interleave path address, wherein the fast path address and the interleave path address are used for synchronization of the first and second pluralities of channels.

23. The interface of claim 22, wherein the special addresses further includes control information, wherein the control information contained by the special addresses is defined by the fast path address and the interleave path address.

24. The interface of claim 23, wherein a host processor generates the start addresses, current addresses, and finish addresses, and provides the start, current, and finish addresses to the routing table.

25. The interface of claim 23, further comprising:

a memory for storing the routing table;

a register, having an input coupled to the routing table, for receiving the start and finish addresses and the current addresses for a selected channel of the plurality of channels, and an output;

a multiplexer having a first input coupled to the output of the register for receiving the current addresses, a second input coupled to the output of the register for receiving the special addresses, and for providing one of either the current addresses or the special addresses as necessary to address the frame memory for retrieving the output data;

an incrementor, coupled to the output of the register, for incrementing a current address to provide an incremented current address; and a comparator, coupled to the output of the register and to the incrementor, for comparing a finish address to the incremented current address, and if the finish address is equal to the incremented current address, providing a start address to the routing table as a next current address, and if the finish address is not equal to the incremented current address, providing the incremented current address as the next current address.

* * * * *